April 11, 1961 J. S. EDISON 2,979,073
CONTROL MECHANISM FOR FLUID UNDER HIGH PRESSURES
Filed Nov. 12, 1957 2 Sheets-Sheet 1

INVENTOR.
JOHN S. EDISON,
BY
his ATTORNEY.

April 11, 1961    J. S. EDISON    2,979,073
CONTROL MECHANISM FOR FLUID UNDER HIGH PRESSURES
Filed Nov. 12, 1957    2 Sheets-Sheet 2
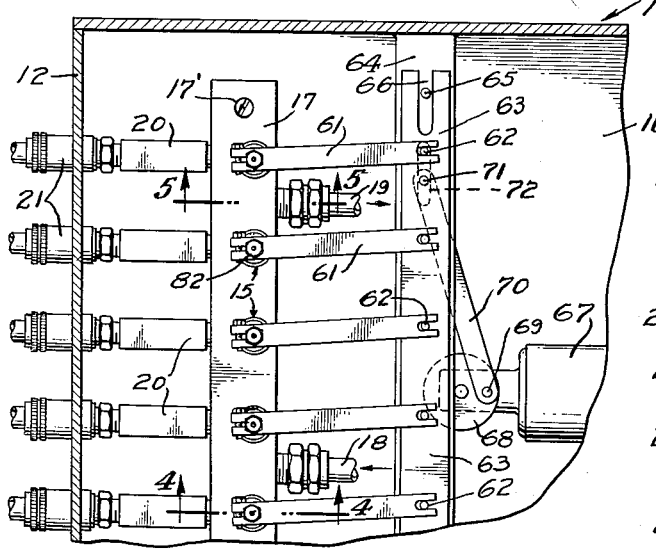
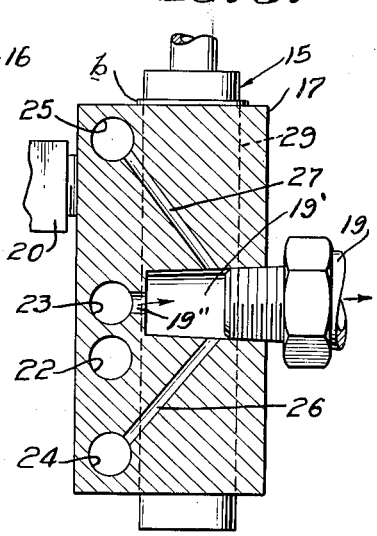
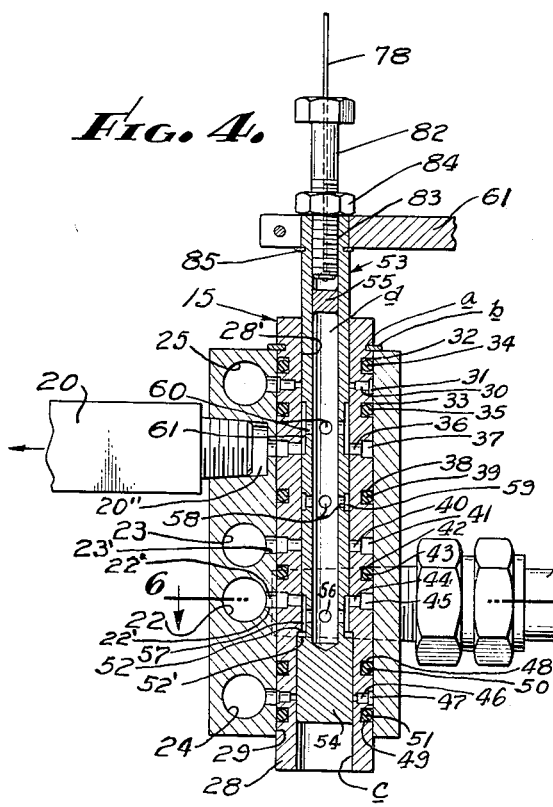
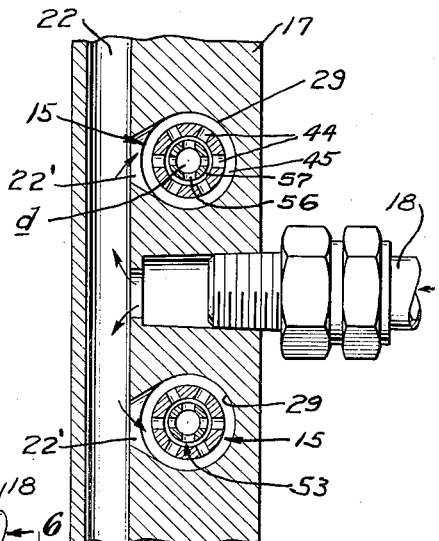
INVENTOR.
JOHN S. EDISON,
BY
Leonard J. Larrabee
his ATTORNEY.

2,979,073
Patented Apr. 11, 1961

2,979,073
CONTROL MECHANISM FOR FLUID UNDER HIGH PRESSURES

John S. Edison, 1434 Broadway, Burbank, Calif.

Filed Nov. 12, 1957, Ser. No. 695,924

15 Claims. (Cl. 137—331)

This invention relates to fluid pressure control mechanisms and particularly to mechanisms controlling a plurality of fluid-actuated devices from a common controller.

This invention relates to improvements in the valve construction and in obtaining more efficient operation of the control for fluid-actuated devices invented by me and as described in Patent No. 2,505,887, granted May 2, 1950.

As an example of the utility of the invention, reference will be made to the static testing of an airplane wing. In such a test, a number of jigs are attached chordwise of the wing and loads imposed on the wing as by a hydraulic jack connected to each jig, the loads being simultaneously and gradually varied so that the behaviour of the wing under such loads may be determined.

Preferably, the loads should preserve a given ratio to one another and should be applied without the occurrence of surges due to jerky movements of any mechanism or of any local loss of pressure due to leakage or lack of uniformity of operation of the various components imposing the loads on the wing.

It is an object of the invention to provide a novel unitary device for controlling a plurality of hydraulic jacks or similar units supplied with fluid under high pressure from a common source and controlled by novel valves free from leakage although high pressures in thousands of pound per square inch are employed.

Another object is to provide a novel valve construction for controlling the flow of fluid under high pressures, such as 10,000 per sq. inch or even up to 20,000 per sq. inch, and whereby leakage of the fluid in or past said valve is reduced to a minimum, thereby maintaining maximum and steady pressure in the outlet line, without likelihood of sharp reductions of the pressure in the outlet line, and which occurs with great rapidity as leakage in the line occurs at such high per square inch pressures.

A further object is to provide a novel self-contained valve construction and mounting block therefor to control fluid under high per square inch pressures and in which, in the event even slight leakage of fluid past the valve occurs, such leakage is automatically returned to the low side of the pump return, and thus eliminate all needs or requirements for drip pans being provided to catch leakage, in the event even slight leakage may occur.

A still further object is to provide a novel valve construction for use in controlling fluid under high pressure, and in which wear of the valve components is practically entirely eliminated, and also whereby adjustment of the valve will effectively control fluid under high pressures without likelihood of surges in altering or maintaining the line pressure, and smooth operation of the actuated devices is assured.

Other objects, advantages and features of invention may appear from the accompanying drawings, the subjoined detail description, and the appended claims.

The accompanying drawings illustrate the invention in a form I at present deem preferable.

Fig. 3 is a fragmental sectional view, on enlarged scale, taken on line 3—3, Fig. 1.

Fig. 4 is an axial sectional view, on enlarged scale, taken on line 4—4, Fig. 3, showing the valve mechanism of my invention and the manifold in which it is mounted.

Fig. 5 is an enlarged sectional view taken on line 5—5, Fig. 3.

Fig. 6 is a fragmentary horizontal sectional view taken on line 6—6, Fig. 4, and on the same scale as Figs. 4 and 5.

Figure 1:
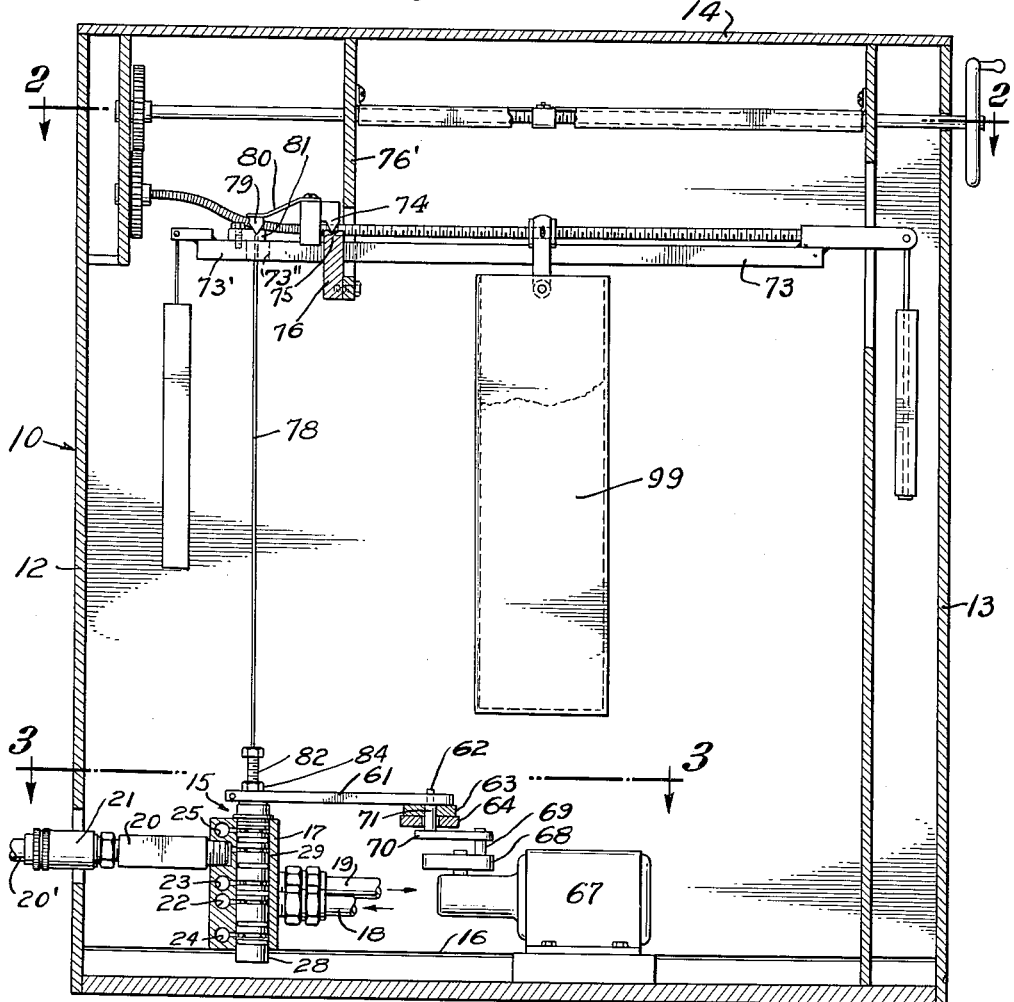
Figure 1 is a vertical detailed sectional view through the casing of the apparatus showing one of the mechanism of the fluid control means for a single (or a pair of) hydraulic jacks controlled by individual valves of my invention and having individual loading levers for each jack (or pair of jacks), but operated by a common pump.

Referring now to Fig. 1, the apparatus is conveniently mounted in a housing 10 having a base plate 11, end walls 12 and 13 and a top 14. Casters (not shown) may be mounted on the base, if desired, to make the apparatus mobile.

A fluid supply tank and pump (not shown) may be mounted on the base, or suitable fluid inlet and outlet connections may be arranged on the housing in a conventional manner.

A bank or plurality of control valve units 15 are mounted in a common mounting member or manifold 17 which is secured by screws 17' at each end of the manifold or header block 17 to a partition 16 spaced above the base. The valves 15 are supplied with fluid under high pressure through an inlet pipe 18 connected (under control of valves 15) to a return pipe 19 which is connected to the low side of the pump return. Each valve 15 has a pressure outlet 20 connected through a union or quick disconnect coupling 21 to a line 20' that leads to an associated jack, pair of jacks or groups thereof, or other associated devices, desired to be controlled by its respective valve in the bank or manifold.

As shown in Figs. 3–6, the mounting member or manifold 17 is formed as a rectangular elongated metal block provided with a number of vertical holes or bores 29, in spaced relation to each other longitudinally in said manifold 17, and in each of said bores 29, a valve unit 15 is mounted.

The valve mounting member 17 is provided with four longitudinal passages 22, 23, 24 and 25, the passageway 22 serving as an inlet manifold to each valve 15 for fluid under pressure supplied thereto by pipe 18 which is connected to the pressure side of a pump (not shown). The passageway 23 serves as an outlet manifold for the fluid from each valve 15, and is connected to a fluid return pipe 19 that is connected to the low side of the pump return.

The bottom passage 24 and top passage 25 provide manifolds for the accumulation of, and the return of, any liquid leakage from each valve 15, and as shown in Fig. 5, passageways 24, 25 are connected by diagonal passageways 26 and 27 to the return port 19' bored transversely into manifold 17 and to which port 19' the return pipe 19 is connected. The port 19' is connected to the fluid outlet manifold 23 through opening 19''. All longitudinal passages 22, 23, 24 and 25 in the member 17 are closed at each of their ends by any suitable means, such as by plugs (not shown).

The valve units 15, as best shown in Figs. 1, 4 and 6, each comprise a sleeve 28 which is mounted in a stationary position in a vertical bore 29 in the header or manifold mounting block 17. The sleeve 28 is provided with a peripheral groove *a* at its upper end in which a C washer *b* is mounted to thereby limit the downward movement of the sleeve 28 in the bore 29 when first positioned therein, and also to align various passageways and ports formed circumferentially around and through the sleeve 28 with various ports provided at different elevations in the wall of the bore 29, as now to be described.

The sleeve 28 toward its upper end is provided with diametrically opposite ports 30 opening into a shallow peripheral groove 31. Circumferential and peripheral grooves 32, 33 are respectively located above and below groove 31, and have O ring seals 34, 35 fitted therein. Below O ring 35 the sleeve is provided with a plurality of circumferentially arranged ports 36 opening into a peripheral groove 37. Spaced below groove 37 is a groove 38 in which an O ring seal 39 is mounted. Below O ring 39 a plurality of circumferentially arranged ports 40 open into a circumferential and peripheral groove 41. Below groove 41 a peripheral groove 42 is arranged and in which is mounted an O ring seal 43. Below groove 42, the sleeve 28 is provided with a plurality of circumferentially spaced ports 44 opening into a circumferential and peripheral groove 45. Toward the lower end of the sleeve 28 a pair of diametrically spaced ports 46 are provided opening into a shallow peripheral groove 47, and above and below groove 47 peripheral and circumferential grooves 48 and 49 are provided in which O ring seals 50 and 51 are positioned.

The sleeve 28 is provided with an axial bore 28' that is of uniform diameter except at the lower end thereof which is counterbored as at *c* to slightly increase its diameter a few thousandths of an inch (from about .002" to .009") and a narrow shoulder 52 is thereby provided.

When sleeve 28 is properly positioned in bore 29 (as shown in Fig. 4), the ports 30 and 46 are aligned to communicate with passages 25 and 24, respectively; and port 36 is in alignment so that its connecting peripheral groove 37 may communicate with the valve outlet 20 through the outlet port 20" into which the pressure outlet connection 20 is threaded. The port 40 will be in communication with the fluid return or outlet manifold 23 through arcuate slots 23' cut through the walls in the header 17 between the bore 29 and passageway 23; port 44 also being in communication with the inlet manifold passageway 22 through arcuate slots 22' also cut in the walls of header 17. As previously pointed out, the sleeve 28 being mounted in a stationary position in the manifold mounting member 17, the various O ring seals serve to effectively separate and seal off the ports and its associated peripheral grooves opening from the axial bore 28' to the peripheral surface of the sleeve from adjacent peripheral grooves and also effectively separate and seal off the openings in the mounting member from adjacent openings in the mounting member 17; and as a result of said seals being stationary after proper positioning of the sleeve 28 in its bore 29, the seals are not subjected to wear as was the sleeve and its supporting bore in the device covered by my Patent No. 2,505,887, above referred to.

A plunger or piston member 53 ground and lapped to be a close sliding fit within the sleeve 28 controls and determines the flow of fluid from the pressure line 22 to the jacks or other mechanism supplied with, or operated by, pressure fluid.

As shown in Fig. 4, a plunger or piston 53 is formed as a hollow tube open at its top and being closed by a solid portion 54 at its lower end. A plug 55 threaded into the upper end of piston 53 is soldered therein to effectively seal the chamber *d*, except for the ports or passageways therefrom, as hereinafter described. Intermediate the length of the plunger 53 it is provided with a plurality of radially arranged ports 56 opening from chamber *d* into a wide shallow groove or peripheral recess 57 formed on the outer surface of the plunger 53 near the lower end thereof; the lower edge of this groove 57 rises from the shoulder 52' that is formed by the slightly increased diameter of the plunger 53 from the lower edge of the groove 57 to the lower end of the plunger, and it is so made to closely but slidably fit the enlarged diameter lower portion of the sleeve 28 where it is counterbored as at *c*. The shoulders 52, 52' prevent upward movement of the plunger 53 after engagement of the shoulders with each other, but downward movement of the plunger 53 is possible.

The groove 57 communicates through an arcuate slot 22' with the pressure inlet manifold 22 in the position of the plunger 53 shown in Fig. 4.

A second port 58 opens through the wall of the plunger 53 intermediate its length and opens into a shallow peripheral groove or peripheral recess that forms a chamber 59 in the surface of the plunger 53 and with the wall of bore 28', and a third port 60 above port 58 opens into a shallow peripheral groove that forms a chamber 61' in the surface of the plunger and confined by wall of bore 28', and which chamber 61' communicates with the outlet 20 through ports 36 and peripheral groove 37.

It is to be noted that there are no seals between the surface of the plunger 53 and the bore 28' in the sleeve 28 and in which it moves.

The alignment of the ports in the plunger 53, sleeve 28 and manifold mount 17 during operation of the mechanism will be later explained.

The plunger 53 is moved vertically and constantly oscillated about its vertical axis by the means now described.

In order to simultaneously oscillate all of the plungers 53, each of the latter has horizontal arms 61, clamped to the upper end thereof. The opposite ends of arms 61 are slotted and straddle pins 62 projecting upwardly from an elongated plate 63, as shown in Fig. 3. Plate 63 slidably rests on a supporting plate 64 which extends from side to side of the casing 13. The plate 63 is guided for reciprocatory longitudinal movement on supporting plate 64 by pins 65 projecting from plate 64 into slots 66 in each end of plate 63. Plate 63 is longitudinally reciprocated by a motor 67 mounted on the base 11 of the casing 10 and which rotates a disc 68 through a bevel drive arrangement. A pin 69 projects upwardly from disc 68 and engages in a hole in one end of a pitman 70. The opposite end of the pitman 70 is provided with a vertical pin 71 which projects upwardly through an elongate slot 72 in supporting plate 64 and is engaged in a hole in plate 63 to thereby provide means to reciprocate plate 63 back and forth in a straight line on supporting plate 64, and thus move the ends of the arms 61 to thereby oscillate the plungers 53 about their vertical axes. It is to be noted that arms 61 may be raised with the individual plunger 53 without the driving connection between the slotted ends of the arms and pins 62 being impaired. The continual oscillation of the valve plungers 53 is effective to facilitate smooth and accurate longitudinal adjustment of plunger 53 in its bore 28' whereby the high pressure fluid of the device may be controlled with a high degree of accuracy and smoothness, and without surging or abrupt fluid flow occurring.

Figure 2:
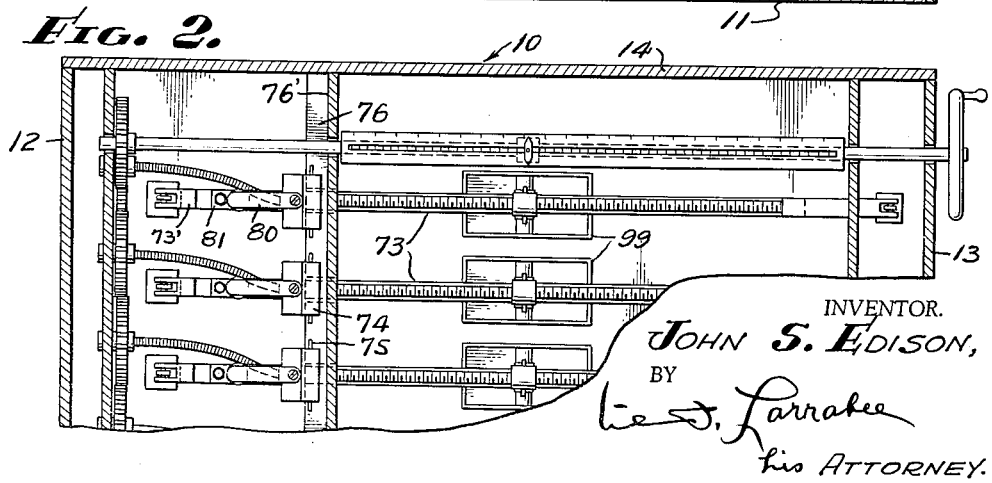
Fig. 2 is a fragmentary horizontal detail sectional view showing the principal parts in plan view, and as taken on line 2—2, Fig. 1.

Since it is required to impose different loads on the mechanisms controlled by the valves and this is effected by varying the vertical position of the plungers 53 in the sleeves 28 and also to vary the amount of load carried by the individual mechanisms controlled by a valve, I provide individual loading beams 73 for each valve (Figs. 1 and 2).

The beams 73 are fulcrumed or pivoted intermediate their ends by knife edges 74 mounted on the beams and resting in V notches 75 in the upper edge of a bar 76 mounted on a supporting plate 76' extending across the upper part of casing 10, the length of the arms 73' of the beams 73 over the valves 15 from the fulcrum point 74, 75 being much shorter than the lengths of the arms of the beam extending in the opposite direction.

Each short arm 73' of the beams 73 is connected by a flexible wire cable 78 fixedly secured at its upper end in a small knife edge fitting 79 which is held by a leaf spring 80 in a V notch in a small slotted block 81 secured to the upper surface of the short arm 73.' The cable passes through a hole 73" in the short arm 73' and is secured to the upper end of a plunger 53 by fixed attachment to a threaded plug 82 that is screwed into the threaded bore 83 in the upper end of the plunger 53. A lock nut 84 on plug 82 prevents upward movement of the arms 61 on the plunger 53 and a C washer 85 positioned adjacent the upper end of plunger 53 positions the arm 61 on plunger 53 and prevents downward movement of arm 61 on the plunger 53.

The function, operation adjustment of the loading beams, the weight pans 99, and of the varying pressures controlled thereby with respect to each valve, are well known in the art, being fully disclosed in Patent No. 2,505,807, above referred to and to which reference is hereby made for the use and operation of analogous parts as shown in the respective drawings, and which may not be specifically identified in this specification. However, in the novel apparatus herein described, the beam 73 operates to raise the plunger 53 by a pulling action through cable 78 rather than a pushing action as disclosed in said Patent No. 2,505,807.

By varying the differential of the diameter of the bore c in sleeve 28 relative to the diameter of the veretical bore 28' therein, the shoulder 52' on plunger 53 and the shoulder 52 in the axial bore 28', will be correspondingly varied, and by such variation of said differential I am able to adapt my novel control valve to a greater number of uses.

I have also discovered that my novel valve control for fluids under high pressure may also be used as a relief valve for such high pressure systems, and this is accomplished by merely reversing the flow of the fluid through the valve.

From the foregoing it will be seen that I have provided a novel valve and valve mount or manifold therefor for the control of fluid under extremely high pressures, such as from 10,000 p.s.i. to 20,000 p.s.i. and in which the valve sleeve 28 with its sealing rings is stationary in the manifold 17, thus enabling the sealing rings to be effective for indefinite periods, because, after assembly of the sleeve 28 in the manifold 17 there is no movement of such parts and consequently no wear occurs, particularly of the sealing rings. The plunger or valve piston 53 and the sleeve 28 are of hardened and ground steel with lapped fit between each other, and the piston 53 being continuously oscillated with an oil film between its moving parts permits delicate adjustments of load to be obtained with smooth operation devoid of jerking movements or surges in the fluid line.

It will also be seen that in the event any fluid should leak between the outer walls of the piston 53 and the bore 28', either above annular recess 61 or below annular recess 57, that such leakage will be passed through ports 30 into annular recess 31 (at the top) and through ports 46 into annular recess 47 (at the bottom) and from which recesses 31 and 47 such leakage will be directed into the passageways 25 and 24 respectively that are connected by passageways 26, 27 to the pump return, thereby containing any and all leakage, if any, within the system.

Fig. 4 illustrates the piston 53 in fully open position with the fluid pressure being able to flow out of outlet 20 to the jack or other device to be operated. As pressure is built up within the chamber d, such pressure is also applied to the shoulder 52' and the piston 53 is moved downwardly against the weight values on the beam 73, to vary the relative co-relation of the control ports with each other and thus effectively control fluid flow.

While I have specifically described and shown embodiments of the invention at present deemed preferable by me, it is to be understood that changes in the described embodiments may be made by those skilled in the art without departing from the scope of the invention as defined by the appended claims.

I claim:

1. In a mechanism for controlling a system having a plurality of fluid pressure supply lines, the combination of a source of fluid pressure, manifold means in communication with said source, valve means associated with said manifold means for controlling the communication of said source with said lines, each valve means including a sleeve non-rotatably supported by said manifold means, and a part movable in response to pressure in the related line and operable to control said pressure, and being carried by said sleeve for movement therein, means for oscillating the said movable parts of the several valve means, a pivoted beam operatively connected with each said movable valve part and operable to balance its respective part against said pressure in the line, weight carrying means movable along each beam, the weights initially supplied to the carrying means serving to establish a given ratio between the pressures supplied to the lines, and means for simultaneously moving said carrying means along their beams to vary said pressure while preserving said ratio.

2. In a mechanism for delivering fluid under high pressure from a supply to a delivery line; a valve means for controlling the pressure supplied to said delivery line from said supply, said valve means including a mounting member; a sleeve non-rotatably supported by said member and having an axial bore in said sleeve; a piston member mounted in said bore and having a chamber therein in communication with said supply and said delivery line through said sleeve and being urged in one direction by the pressure from said supply being applied to one end of said piston member to decrease the fluid pressure supplied to said delivery line; means connected to the other end of said piston member to urge said piston in an opposite direction to increase said pressure to said delivery line; and means connected at said last mentioned end of said piston to oscillate said piston; and fluid return means to conduct fluid from the chamber in said piston to said supply.

3. In a mechanism for delivering fluid under high pressure from a supply to a delivery line; a valve means for controlling the pressure supplied to said delivery line from said supply, said valve means including a mounting member; a sleeve non-rotatably supported by said member and having an axial bore through said sleeve, and said bore being of larger diameter at one end thereof; a piston member mounted in said bore and having an enlarged portion to fit the larger diameter of the bore, and having a chamber therein in communication with said supply and said delivery line through said sleeve, the enlarged portions of said sleeve and piston forming shoulders at one end which when separated form a chamber; and said piston being urged in one direction by the pressure from said supply applied to said chamber, and movable to decrease the openings through which fluid pressure is supplied to said delivery line; means to urge said piston in an opposite direction to increase the openings through which fluid is supplied to said delivery line; means to oscillate said piston; and said means to urge said piston in an opposite direction and said oscillating means coacting with the end of said piston opposite to that end of the piston acted upon by pressure from said supply.

4. In a mechanism for controlling a system having a plurality of fluid pressure supply lines from a source of fluid pressure controlled by a plurality of valves and having means to individually load said valves and control said loading means in unison; comprising a manifold mounting member having a plurality of vertical bores therein and containing an inlet manifold for the supply of pressure fluid to said supply lines and in communication with said source, an outlet manifold in said member for the return of fluid to the source of fluid pressure and an outlet port in said member for each fluid pressure supply line and in communication with an associated vertical bore, a sleeve mounted stationary in each of said bores and having an axial bore; there being ports leading from the inlet manifold in the mounting member and in communication with each vertical bore; ports leading from the outlet manifold in said mounting member and in communication with vertical bore; said sleeves having a plurality of peripheral grooves and ports leading from each groove into said axial bore; leakage sealing means in said vertical bore between said mounting member and said sleeves positioned on each side of the ports in the mounting member and in the sleeves; a plunger member having an axial chamber therein closed at each end and fitted in the vertical bore of each sleeve, said chamber being in communication with the various ports in said sleeve; and an operative connection between said plunger member and the loading means to adjust the amount of alignment of the ports in the plunger member and the sleeve according to the load placed on said loading elements on the longitudinal movement of the plunger caused by said loading means.

5. A mechanism as set forth in claim 4, and in addition comprising an additional manifold arranged below the inlet manifold and in communication with the lower part of said vertical bores; another manifold arranged above the outlet manifold and in communication with the upper part of said vertical bores; and said additional manifolds being in communication with the pressure fluid outlet from said manifold.

6. A mechanism as set forth in claim 4 and in which the bores of the sleeves in said mounting member are counterbored at one end to provide a shoulder, and the plunger members being increased in diameter at one end to fit in said counterbored end of said sleeve and to provide a shoulder adjacent the shoulder on the wall of the bores of the sleeves.

7. A mechanism as set forth in claim 4 and in which said manifold mounting means is positioned below the loading means, and including cables connecting said plungers to said loading means.

8. In a mechanism, a liquid supply source, means delivering fluid under high pressure from said source through a supply line to a delivery line; a mounting member in communication with said source; valve means associated with said mounting member controlling communication of said source with said delivery line; said valve means including a sleeve non-rotatably mounted in said mounting member, and a part movable longitudinally in said sleeve in response to pressure in the supply line being applied to one end of said part to control said pressure, said part being carried by said sleeve for reciprocal and oscillatable movement therein; means for reciprocating said part in an opposite direction means for oscillating said movable part during reciprocal and non-reciprocal movement thereof, said reciprocating means and said oscillating means co-acting with the other end of said part.

9. In a mechanism for delivering fluid under high pressure from a source of supply to a delivery line; valve means controlling the pressure of fluid, and including a mounting member having a bore therein; a sleeve non-rotatably mounted in said bore; a piston member slidably and oscillatably mounted in said sleeve, and having a chamber therein; means delivering fluid under pressure to said chamber; said piston being urged in one direction by fluid pressure from said chamber acting on one end of said piston; piston operating means to move said piston in an opposite direction to control the pressure of the fluid; and means to oscillate said piston; said piston operating means including means to establish the flow of pressure from said chamber; and said piston operating means and said oscillating means co-acting with the piston at the end opposite that on which the fluid pressure acts to urge the piston in one direction.

10. A mechanism as set forth in claim 9, and in addition a fluid return means to conduct fluid tending to escape from around the piston back to the supply.

11. A mechanism as set forth in claim 8, and in which the sleeve is counterbored at one end to provide a shoulder, and said part being increased in diameter at one end to fit in said counterbored end of said sleeve to provide a shoulder adjacent to, and a space between, the first mentioned shoulder.

12. A mechanism as set forth in claim 8, and in addition a fluid return means to conduct fluid tending to escape from around the said part back to the supply.

13. A mechanism as set forth in claim 11, and in which the pressure in the supply line is applied to the space between said shoulders.

14. In a mechanism for delivering fluid under high pressure from a supply to a delivery line; a valve means for controlling the pressure supplied to said delivery line from said supply, said valve means including a mounting member; a sleeve non-rotatably supported by said member and having an axial bore in said sleeve; a piston member mounted in said bore and having a chamber therein in communication with said supply and said delivery line through said sleeve, and being urged in one direction by the pressure from said supply being applied to one end of said piston member to decrease the fluid pressure supplied to said delivery line; means connected to the other end of said piston member to urge said piston in an opposite direction to increase said pressure to said delivery line; and means connected at said last mentioned end of said piston to oscillate said piston.

15. A mechanism as set forth in claim 14 and in which there are passageways in said mounting member and sleeve to direct any leakage of fluid from adjacent each end of said piston to said fluid supply.

References Cited in the file of this patent

UNITED STATES PATENTS

| | | |
|---|---|---|
| 1,594,021 | Smith | July 27, 1926 |
| 1,819,615 | Mayr | Aug. 18, 1931 |
| 2,505,887 | Edison | May 2, 1950 |
| 2,600,746 | Ernst | June 17, 1952 |
| 2,647,530 | Jaquith | Aug. 4, 1953 |
| 2,662,543 | Stacey | Dec. 15, 1953 |

FOREIGN PATENTS

| | | |
|---|---|---|
| 546,927 | Canada | Oct. 1, 1927 |